Patented Mar. 5, 1946

2,396,054

UNITED STATES PATENT OFFICE 2,396,054

INSECTICIDES

Orville E. McKim, Port Chester, N. Y., assignor to Stanco Incorporated

No Drawing. Application May 30, 1942, Serial No. 445,204

5 Claims. (Cl. 167—24)

This invention relates to improvements in insecticides, in particular those solutions containing active principles synthetically prepared or extracted from such plant material as pyrethrum, derris, cube, timbo, etc., and known as fish poisons and possessing a high insecticidal potency and other desirable properties which permit of direct application of the insecticides to the skin of man or animals in the treatment of follicular mange, scabies, itch mite, lice, fleas, ticks, chiggers, and similar parasites.

Various solvents have been used for the extraction of plant materials such as pyrethrum, and as carriers for the extracted and synthetically prepared active insecticidal principles. The most common solvent employed for this purpose is a light petroleum distillate of approximately the same boiling range as kerosene, since this is the type of solvent ordinarily present in the finished insecticide. Other low boiling solvents, such as alcohols, ketones, ethylene dichloride, naphthas, etc., frequently are used to extract the active principles from the plant material; in which case it is customary to concentrate the extract by distilling off the solvent, after which the concentrated active principle is redissolved in a petroleum distillate of approximately the boiling range of kerosene in proper proportion to give a product which is substantially non-explosive and can be sprayed safely in a closed room for killing ordinary household pests such as flies, mosquitoes, roaches, bed bugs, etc. Insecticides of this type, comprising a hydrocarbon base such as kerosene, are applicable for killing ordinary household insects as described, but are not generally applicable for insects attacking plant life because of the tendency of the hydrocarbon base to burn or injure the plants after application.

A second general method of preparing insecticides from plant materials is to extract such material, as pyrethrum, with kerosene or other suitable solvent in order to obtain a concentrated extract of the active principle. To this concentrate is added a soap or other suitable emulsifier, which mixture is emulsified with a large volume of water before spraying upon the insects to be exterminated. This second type of insecticide is especially suitable for killing insects which infest green foliage such as various types of vegetables, flowers, shrubs, trees, etc. These emulsifiable insecticides are not suitable for general spraying of household insects because of the danger of staining fabrics, wall paper and painted and varnished surfaces. They are particularly adapted to application to green foliage because the oil or hydrocarbon content of the diluted spray is sufficiently dilute as to be harmless to plant life.

Laboratory and field research has demonstrated that neither of the two types of insecticide compositions above mentioned, is suitable for the extermination and repulsion of numerous parasites that attack or infest the skin of man and animals or the successful treatment of skin disorders or discomforts caused by such parasites. The first type of product, possessing a light petroleum distillate as a carrier, although quite effective against human or animal parasites, has in many instances been proven to be exceedingly irritating to the skin—even to the extent of causing severe burning of the skin often resulting in depilation.

The second or emulsified type of insecticide is less severe in its effect upon the skin but research has demonstrated that it is far less toxic in its action on the insects under discussion due to its lack of penetrating properties.

According to this invention, a solution of active plant or synthetically prepared insecticidal materials dissolved in a suitable mixture of a low boiling monohydric aliphatic alcohol and petroleum hydrocarbons, was found to possess exceptional penetrating properties which makes it far more effective in the treatment of mange, mites, itch mites, lice, ticks, chiggers, fleas, and other parasites attacking man or animals than either of the two types of products hereinbefore described. In addition thereto these compositions are particularly suitable for use on the skin of human and animal prey of insects, and can be applied freely without the slightest danger of irritation or damage to the skin. A further advantage of this composition is that it is non-oily or greasy as the volatile menstruum evaporates quickly after application leaving no detrimental or otherwise undesirable oily film on the skin.

In order to thoroughly understand the manner in which this composition functions, it will be necessary to understand the nature of the various parasites mentioned.

The disease *Psoroptic acariasis* often referred to as "follicular mange" is a serious problem affecting animals, particularly dogs. When it affects dogs it masquerades under such names as eczema, skin trouble, summer rash, kennel rash, and many others, and is also referred to as red mange, demodetic mange and incurable mange. It causes more discomfort and distress to dogs than any other malady. It is persistent, usually showing up as recurrent attacks in spring, summer and fall unless effective measures are taken to alleviate or cure it.

A mite, microscopic in size (*Demodex folliculorum*), is the etiological agent of follicular mange. This mite lodges in the hair follicles and sets up an acute irritation through the toxins, secretions and excretions caused by its depredations. In addition the hatching of the eggs and development of the young mites causes distention of the hair follicles which intensifies the irritation.

The outstanding symptoms in ordinary active cases are bare spots, ulcers, constant scratching and biting of the skin, and an unpleasant, fetid odor, which is particularly noticeable on rainy days or during and after a bath. This odor is often referred to as a "doggy odor," which term is erroneous and misleading inasmuch as there is no odor to a healthy dog. This characteristic "doggy" odor therefore can be considered as being a diagnostic symptom of follicular mange, in either acute or chronic form and in apparently improved cases. In badly aggravated cases emaciation is quite common and a marked lethargy or listlessness is also observed. The skin becomes thickened and wrinkled, the paws swollen and an oily discharge may also be observed in the sores and bare patches.

In chronic, subacute cases which exhibit no depilitated or inflamed areas, there are three diagnostic symptoms in addition to the characteristic odor: constant scratching, particularly noticeable at night after retirement, biting or licking the toes, forelegs and ankles, and constant shedding of hair. A close inspection of the axillae, abdomen and inner surface of the thighs may also disclose pimples, pustules or actively inflamed areas.

Another type of mange prevalent in animals, and especially in cats, is *Sarcoptic acariasis*. In this case, the parasite is a mite known as *Sarcoptes scabiei* (var.) which burrows or tunnels into the epidermis or outer surfaces of the skin causing an irritation, severe itching and eventual formation of scabs somewhat similar to the condition described in the case of follicular mange. Parasites in this class also attack humans, being commonly referred to as the itch mite, and giving rise to the condition commonly known as "scabies."

Other common parasites which attack the skin but do not burrow beneath the outer surface are lice of various types, ticks and fleas. In the case of lice, there are many types attacking animals. There are also several common types attacking humans, such as *Pediculi capitis* or head lice and *Pediculi pubis*, commonly known as crab lice. These insects live and reproduce on the body attaching their eggs to the hair with a mucilage-like material. Other types of human lice, such as the commonly called body lice (cooties, typhus louse, etc.) live and reproduce in the clothing, attacking the host only for the purpose of feeding or sucking blood. Ticks, of which there are several varieties, attach themselves to man or animals by inserting their heads beneath the surface of the skin for the purpose of sucking blood, the eggs being laid and hatched away from the host after engorgement with blood has been completed. Fleas of various types also feed upon the blood of man and animals.

Experiments have proven conclusively that the insecticidal compositions prepared according to this invention are very much more effective in destroying and repelling the above mentioned parasites than the usual compositions employing a simple hydrocarbon base or an alcohol base. This extraordinary high potency toward insect life is apparently due largely to the combined solvent effect of the hydrocarbon-alcohol mixture in my compositions upon the chitinous exoskeleton of the insect and the penetration of similar structures which surround the insect eggs or nits. Due to this unique solvent, the active insecticidal ingredients diffuse much more readily into the interior of the organism resulting in certain death. Conversely the chitinous exterior is not readily penetrated by insecticides employing a pure hydrocarbon or saponaceous base.

As an illustration and comparison of the extraordinary insecticidal potency of my compositions with other mixtures, wood ticks were immersed in a petroleum-hydrocarbon base insecticide containing a high percentage of pyrethrum extract for several minutes without any apparent toxic effect, the saturated insects remaining actively alive and entirely normal. Insects of the same species when treated with one drop of the product prepared according to this invention, became paralyzed within a few minutes and died without regaining any normal function.

This phenomenal penetrating action of my compositions also is important in the treatment of follicular mange, scabies, comedos (blackheads), etc. as upon application the active ingredients are diffused in to the hair follicles, derm or burrows, and kill the parasites much more rapidly and with greater certainty than will an insecticide having a hydrocarbon base. At the same time these compositions are absolutely non-irritating to the sensitive skin of man or animals as contrasted with the usual low boiling, hydrocarbon insecticides which in many instances have caused painful irritations to the skin often resulting in extensive depilations.

Another advantage of my compositions particularly in the treatment of *Pediculi capitis* and *Pediculi pubis* in the human, is that these compositions immediately dissolve the mucilagenous substance with which the eggs or nits are glued to the hair of the host, resulting in their being easily removed by combing. In addition and of equal importance the penetrating and dehydrating action of these compositions, collapses the nits, destroying them immediately.

An equally important and outstanding advantage is demonstrated in the control of body lice (greybacks—cooties) on the human body, through the immediate death of these parasites when these compositions are applied, as well as the collapse and dehydration of the eggs in the seams of clothing following applications of these compositions.

Other persistent parasites that cannot be quickly killed by products usually applied are chiggers which penetrate and lodge in the skin of infested victims. Field tests have demonstrated that the compositions described in my invention will rapidly diffuse into the skin and immediately kill the chigger before any great irritation is produced by its presence whereas oily or soapy compositions not having penetrating properties do not have a killing power sufficient to destroy these parasites.

An advantage equally outstanding with those heretofore cited is observed in the control of lice infestations on animals. One application only of these compositions is sufficient to kill all lice and eggs, whereas it is necessary to employ several applications of products commonly used to produce the results accomplished by one application of this invention. It is pertinent also to contrast the absolute freedom from skin irritation that exists after the application of this invention, with the discomfort and distress often produced by other compositions. These may range from light irritations to burns, often extending to depilation of the affected area.

According to this invention organic plant material of the fish poison type such as pyrethrum flowers or a mixture of pyrethrum flowers and derris, cube, timbo, etc. may be extracted with a low boiling petroleum distillate, such as kerosene, naphtha, etc., and this extract is then blended with from 95 to 80% of isopropyl alcohol—the resulting solution contains the active insecticidal ingredients such as pyrethrins, rotenone or other toxic principles. Other lower monohydric aliphatic alcohols, such as ethyl alcohol, may be used if desired. A small proportion of higher boiling petroleum oil, vegetable oils or essential oils may likewise be added. The proportions of alcohol may range from 95% to 80% and the proportion of the other main constituent, hydrocarbon oil, from 5 to 20%. A small proportion of water may be present but not enough to cause a layer separation of the alcohol and hydrocarbon oil.

According to this invention the insecticidal solution also may be prepared by extracting the plant material directly with a solution containing 95 to 80% of isopropyl alcohol and 5 to 20% of petroleum oil. Also it is possible to carry out the extraction with isopropyl alcohol and later combining the extract with petroleum hydrocarbon oil in the above-mentioned proportions.

The composition which has been found most effective will contain from 0.2% to 2.0% of pyrethrins I and II extracted from pyrethrum flowers in a mixture of 90% isopropyl alcohol and 10% of a refined petroleum hydrocarbon distillate having a boiling range of approximately 400–500° F. To this mixture may be added in varying amounts rotenone or active insecticidal resins obtained from derris, cube, timbo, etc.

As another example of the extraordinary penetrating properties of this composition which showed the effectiveness of the combination of hydrocarbon oil and alcohol as compared with alcohol alone, the following test is given. Two identical solutions containing 0.2% pyrethrins I and II extracted from pyrethrum flowers were prepared.

1 (a) being dissolved in a mixture of 10% hydrocarbon oil and isopropyl alcohol, and 2 (b) being dissolved in straight isopropyl alcohol without the addition of hydrocarbon oil.

One of these preparations was applied to the left side of a dog and the other to the right side of the same dog which was suffering with an advance case of follicular mange. After several treatments it was shown that the side of the animal to which mixture (b) had been applied was only very slightly improved whereas the side of the animal to which the mixture containing hydrocarbon oil had been applied (a) was very markedly improved and subsequently completely healed. This method of control, using a single animal, has been repeated with similar conclusive results, showing the much greater effectiveness of preparations combining petroleum hydrocarbon oil and alcohol in the proportions stated.

The advantages of this invention also may be had when synthetically prepared insecticides are used either by themselves or in combination with naturally occurring insecticidal agents when dissolved in a mixture of 95% to 80% of alcohol and 5% to 20% of petroleum oil.

Outstanding among the numerous synthetic insecticides which can be used in these compositions are such synthetics as N-isobutyl undecylen amide and organic thiocyanates or their derivatives either alkyl or aryl types. Of the thiocyanates three important members are "Thanite" (secondary terpene-alcohol thiocyanyl acetate, U. S. Pat. Nos. 2,209,184; 2,217,611), "Lethane" and "Lethane 384 Special"—the two latter being complex organic thiocyanates.

I claim:

1. An insecticidal solution comprising 0.2% to 2.0% pyrethrins I and II and 95% to 80% of isopropyl alcohol and 5% to 20% of kerosene.

2. An insecticidal solution comprising 0.2% to 2.0% of pyrethrins I and II, 95% to 80% of isopropyl alcohol and 5% to 20% of a light petroleum lubricating oil.

3. An insecticidal solution for application to human or animal skin, comprising a fish poison, and a mixture of lower monohydric aliphatic alcohol and a light petroleum lubricating oil in amounts sufficient to facilitate penetration of the skin.

4. An insecticidal solution, comprising about 0.2% to 2.0% of fish poison, about 95% to 80% of a lower monohydric aliphatic alcohol and about 5% to 20% of light petroleum lubricating oil.

5. An insecticidal solution, comprising about 0.2% to 2.0% of a fish poison, about 95% to 80% of ethyl alcohol and about 5% to 20% of a light petroleum lubricating oil.

ORVILLE E. McKIM.